(12) United States Patent  
Koshizen et al.

(10) Patent No.: US 9,174,550 B2  
(45) Date of Patent: Nov. 3, 2015

(54) ELECTRIC VEHICLE DRIVING SUPPORT SYSTEM

(71) Applicant: HONDA MOTOR CO., LTD., Tokyo (JP)

(72) Inventors: Takamasa Koshizen, Wako (JP); Junji Eguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/855,225

(22) Filed: Apr. 2, 2013

(65) Prior Publication Data

US 2013/0268152 A1    Oct. 10, 2013

(30) Foreign Application Priority Data

Apr. 4, 2012    (JP) .................................. 2012-085327

(51) Int. Cl.
*B60L 9/00* (2006.01)
*B60L 11/00* (2006.01)
(Continued)

(52) U.S. Cl.
CPC ............... *B60L 15/2045* (2013.01); *B60L 3/12* (2013.01); *B60L 2240/68* (2013.01);
(Continued)

(58) Field of Classification Search
CPC ............ B60L 15/2045; B60L 2240/68; B60L 2250/16; B60L 2260/54; B60W 10/06; B60W 10/11; B60W 40/076; B60W 30/12; B60W 50/10; B60W 2720/106; B60W 30/143; B60W 10/04; B60W 50/097; B60W 30/188; B60W 40/09; B60W 40/04; G08G 1/00; G08G 1/16; G08G 1/08; G08G 1/123; G08G 1/205; G08G 1/20; G08G 1/1167; Y02T 10/84; Y02T 10/56; Y02T 10/52
USPC ......... 701/22, 2, 1, 70, 96, 119, 93, 118, 532, 701/102, 123, 36; 340/905, 435, 907
See application file for complete search history.

(56) References Cited

U.S. PATENT DOCUMENTS 7,912,628 B2 * 3/2011 Chapman et al. ............. 701/117
7,953,544 B2 * 5/2011 Amemiya et al. ............ 701/117
(Continued)

FOREIGN PATENT DOCUMENTS

CN      101795919 A     8/2010
CN      102219019 A    10/2011
(Continued)

OTHER PUBLICATIONS

Chinese Office Action with English Translation dated Mar. 30, 2015, 12 pages.
(Continued)

*Primary Examiner* — Calvin Cheung
*Assistant Examiner* — Luis A Martinez Borrero
(74) *Attorney, Agent, or Firm* — Rankin, Hill & Clark LLP

(57) ABSTRACT

An electric vehicle driving support system includes an acquisition unit that acquires predictive information of traffic congestion calculated based on acceleration of an electric vehicle and an economical driving mode output unit that outputs a control instruction to prioritize speed maintenance or acceleration when the predictive information of traffic congestion acquired by the acquisition unit indicates a non-congestion tendency, and that outputs a control instruction to prioritize deceleration when the predictive information of traffic congestion indicates a congestion tendency.

4 Claims, 10 Drawing Sheets

(51) Int. Cl.
*G05D 1/00* (2006.01)
*G05D 3/00* (2006.01)
*G06F 7/00* (2006.01)
*G06F 17/00* (2006.01)
*B60L 15/20* (2006.01)
*B60L 3/12* (2006.01)

(52) U.S. Cl.
CPC ......... *B60L 2240/70* (2013.01); *B60L 2250/16* (2013.01); *B60L 2250/30* (2013.01); *B60L 2260/52* (2013.01); *B60L 2260/54* (2013.01); *Y02T 10/7283* (2013.01); *Y02T 10/7291* (2013.01); *Y02T 90/16* (2013.01); *Y02T 90/161* (2013.01)

(56) References Cited

U.S. PATENT DOCUMENTS

| | | | |
|---|---|---|---|
| 8,036,820 B2* | 10/2011 | Sera | 701/117 |
| 8,190,362 B2* | 5/2012 | Barker et al. | 701/414 |
| 8,577,586 B2* | 11/2013 | Niki et al. | 701/118 |
| 8,700,296 B2* | 4/2014 | Chapman et al. | 701/117 |
| 2001/0034575 A1* | 10/2001 | Takenaga et al. | 701/96 |
| 2004/0193347 A1* | 9/2004 | Harumoto et al. | 701/45 |
| 2006/0047410 A1 | 3/2006 | Oka | |
| 2006/0055565 A1* | 3/2006 | Kawamata et al. | 340/995.13 |
| 2006/0106530 A1* | 5/2006 | Horvitz et al. | 701/117 |
| 2006/0122846 A1* | 6/2006 | Burr et al. | 705/1 |
| 2006/0155427 A1* | 7/2006 | Yang | 701/1 |
| 2006/0195250 A1* | 8/2006 | Kawaguchi | 701/117 |
| 2007/0208498 A1* | 9/2007 | Barker et al. | 701/117 |
| 2007/0299595 A1* | 12/2007 | Boldin | 701/117 |
| 2008/0120175 A1* | 5/2008 | Doering | 705/14 |
| 2009/0271084 A1 | 10/2009 | Taguchi | |
| 2010/0004839 A1* | 1/2010 | Yokoyama et al. | 701/70 |
| 2010/0250059 A1* | 9/2010 | Sekiyama et al. | 701/35 |
| 2011/0035141 A1* | 2/2011 | Barker et al. | 701/119 |
| 2012/0035818 A1* | 2/2012 | Takanami et al. | 701/54 |
| 2012/0078467 A1* | 3/2012 | Schweikl et al. | 701/36 |
| 2012/0078468 A1* | 3/2012 | Popp et al. | 701/36 |
| 2012/0078496 A1* | 3/2012 | Lindhuber et al. | 701/123 |
| 2012/0109421 A1* | 5/2012 | Scarola | 701/2 |
| 2012/0123660 A1* | 5/2012 | Kagawa et al. | 701/96 |
| 2013/0013164 A1* | 1/2013 | Taguchi | 701/96 |
| 2013/0110315 A1* | 5/2013 | Ogawa | 701/1 |
| 2013/0110316 A1* | 5/2013 | Ogawa | 701/1 |
| 2013/0124012 A1* | 5/2013 | Shida et al. | 701/2 |
| 2013/0253750 A1* | 9/2013 | Otake | 701/22 |
| 2013/0325306 A1* | 12/2013 | Caveney et al. | 701/117 |

FOREIGN PATENT DOCUMENTS

| | | |
|---|---|---|
| JP | 06-191319 | 7/1994 |
| JP | 09-259397 | 10/1997 |
| JP | 2000-134719 | 5/2000 |
| JP | 2001-169408 | 6/2001 |
| JP | 2004-194456 | 7/2004 |
| JP | 2005-028934 | 2/2005 |
| JP | 2009-262862 | 11/2009 |
| JP | 2010-183733 | 8/2010 |
| JP | 2010-200590 | 9/2010 |
| JP | 2011-068308 A | 4/2011 |
| JP | 2011-069640 | 4/2011 |
| JP | 2011-145929 | 7/2011 |
| JP | 2012-128614 | 7/2012 |
| JP | 2012-219759 | 11/2012 |
| WO | 2012/014033 A1 | 2/2012 |

OTHER PUBLICATIONS

Japanese Office Action with English Translation dated Aug. 25, 2015, 9 pages.

* cited by examiner

ELECTRIC VEHICLE DRIVING SUPPORT SYSTEM

BACKGROUND OF THE INVENTION

1. Field of the Invention

The present invention relates to an electric vehicle driving support system.

Priority is claimed on Japanese Patent Application No. 2012-085327, filed on Apr. 4, 2012, the content of which is incorporated herein by reference.

2. Description of Related Art

In the related art, for example, a driving support apparatus is known which urges a driver to perform a driving manipulation which improves a fuel efficiency based on periodicity of accelerator manipulation and predictive information of traffic congestion (for example, see Japanese Patent Application No. 2011-088567).

Additionally, in the related art, for example, a controller for a hybrid vehicle is known that sets an allowable upper limit of discharge capacity of a battery in consideration of charge capacity which can be achieved by a regenerative braking expected during in a downhill road, and that controls so that the residual capacity becomes minimum at the highest point of a traveling route (for example, Japanese Unexamined Patent Application, First Publication No. 2001-169408).

Additionally, in the related art, for example, a charging controller is known that improves fuel efficiency and suppresses exhaust gas by raising the upper limit value of residual capacity of a battery when a position, at which traffic congestion occurs, is detected, charging the battery so that the residual capacity of the battery reaches the upper limit value of residual capacity when the vehicle reaches the traffic congestion, and lowering the lower limit value of residual capacity and traveling by the driving power of a motor during in the traffic congestion (for example, see Japanese Unexamined Patent Application, First Publication No. 2000-134719).

SUMMARY OF THE INVENTION

The driving support apparatus according to the above-mentioned related art can only support the driving in consideration of a fuel consumption tendency depending on the frequency characteristics of accelerator manipulation, and there is a need for controlling a regenerative electric vehicle in consideration of more comprehensive energy balance.

The controller according to the above-mentioned related art can only charge a battery in consideration of the regenerative braking during in a downhill road, and there is a need for making a control in consideration of energy balance during in traffic congestion.

The charging controller according to the above-mentioned related art can only prioritize the electrical traveling during in traffic congestion, and there is a need for making a control in consideration of more comprehensive energy balance during in traffic congestion.

The aspect of the present invention is made in consideration of the above-mentioned circumstances and an object thereof is to provide an electric vehicle driving support system which can comprehensively support economical driving based on predictive information of traffic congestion.

In order to solve the above-mentioned problems and to achieve the above-mentioned object, an electric vehicle driving support system according to the present invention employs the following configurations.

(1) An electric vehicle driving support system according to an aspect of the present invention includes: an acquisition unit that acquires predictive information of traffic congestion calculated based on acceleration of an electric vehicle; and an economical driving mode output unit that outputs a control instruction to prioritize speed maintenance or acceleration when the predictive information of traffic congestion acquired by the acquisition unit indicates a non-congestion tendency, and that outputs a control instruction to prioritize deceleration when the predictive information of traffic congestion indicates a congestion tendency.

(2) The electric vehicle driving support system according to (1) may further include a display unit that changes a display mode depending on details of the control instruction output from the economical driving mode output unit.

(3) The electric vehicle driving support system according to (1) or (2) may further include a control unit that controls the driving of the electric vehicle depending on details of the control instruction output from the economical driving mode output unit.

(4) The electric vehicle driving support system according to (1) or (2) may further include: a regeneration prioritization mode output unit that outputs a control instruction to prioritize deceleration regardless of whether the predictive information of traffic congestion indicates a non-congestion tendency or the predictive information of traffic congestion indicates a congestion tendency; and a setting unit that sets which of the economical driving mode output unit and the regeneration prioritization mode output unit to select depending on an input from a driver.

According to the aspect of (1), when the predictive information of traffic congestion indicates a non-congestion tendency (a tendency to rectify a traffic flow), maintaining of a present speed or accelerating to avoid formation of a vehicle group contributes to avoiding traffic congestion and allows desired driving with a slow variation in speed, thereby resulting in improvement of fuel efficiency.

On the other hand, when the predictive information of traffic congestion indicates a congestion tendency (a tendency to non-rectify a traffic flow), obtaining of regenerated energy by necessary deceleration depending on the traffic flow can realize economical driving in comprehensive energy balance, for example, compared with losing of energy by maintenance of a speed or acceleration.

According to the aspect of (2), acceleration and deceleration are determined depending on a driver's intention, but it is possible to urge a driver to perform an economical driving manipulation by providing the driver with information for supporting economical driving on a display such as an appropriate meter or an information display.

According to the aspect of (3), since the predictive information of traffic congestion, for example, based on an acceleration spectrum (a power spectrum obtained by frequency-analyzing acceleration) of the electric vehicle has a high real-time property, there are situations which are difficult for a driver to switch the driving manipulation at this response speed. Even in this case, by automatically controlling traveling of the electric vehicle depending on details of the control instruction output from the economical driving mode output unit, it is possible to perform the optimal driving manipulation and to easily realize economical driving.

According to the aspect of (4), in a regenerative type electric vehicle, by performing a regeneration prioritization mode, which increases the cruising range by regeneration, instead of driving to avoid traffic congestion, it is possible to travel with a priority given to regeneration regardless of the predictive information of traffic congestion and thus the economical driving in comprehensive energy balance can be realized.

DESCRIPTION OF EMBODIMENTS

Figure 1:
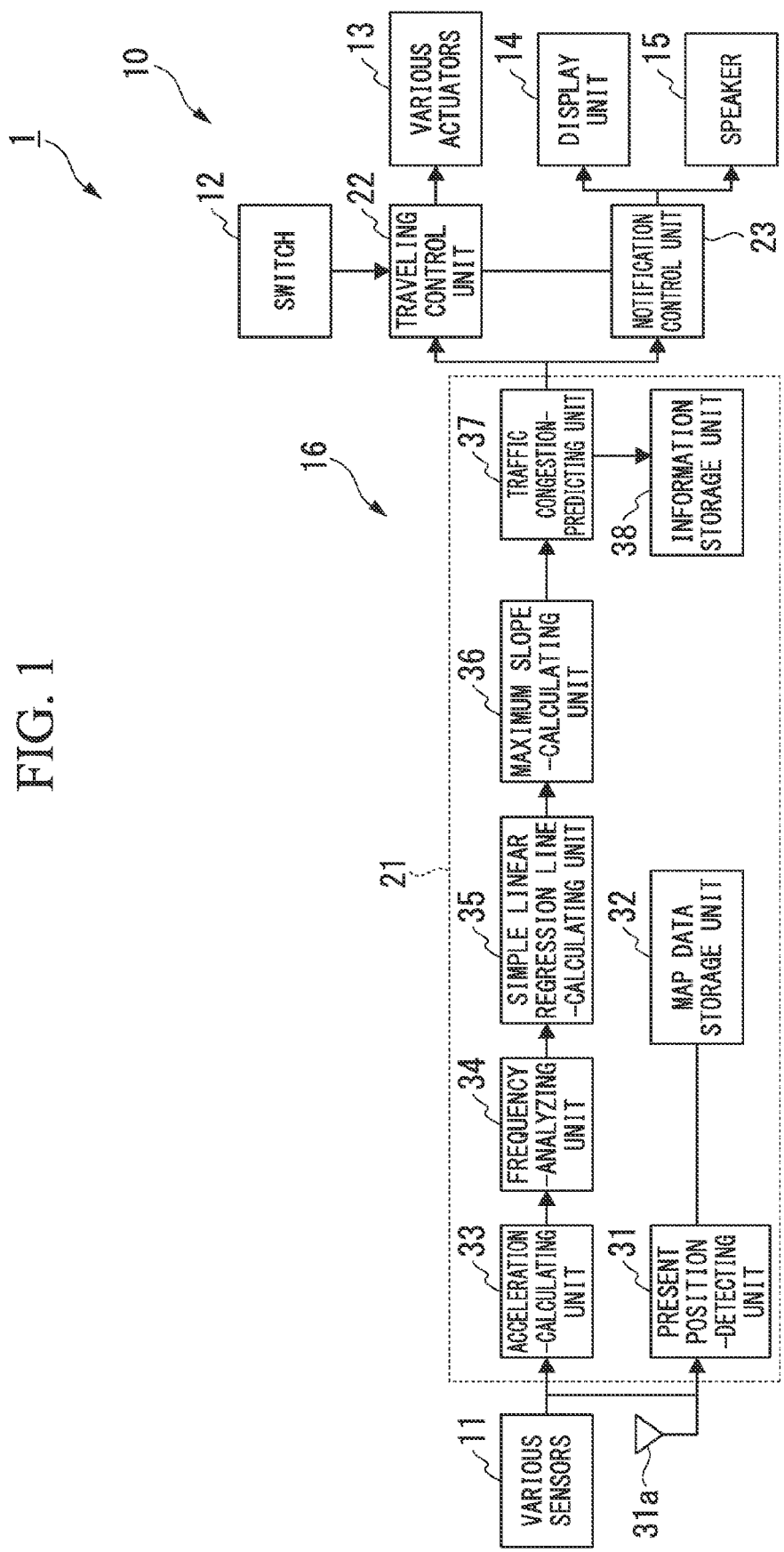
FIG. 1 is a diagram illustrating a configuration of an electric vehicle equipped with an electric vehicle driving support system according to an embodiment of the present invention.

Hereinafter, an electric vehicle driving support system according to an embodiment of the present invention will be described referring to the accompanying drawings.

An electric vehicle driving support system 10 according to the present embodiment is mounted on an electric vehicle 1 that travels with a driving force of a motor (not shown) driven with a supply of power from a power source (not shown) such as a battery, and includes various sensors 11, a switch (setting unit) 12, various actuators 13, a display (display unit) 14, a speaker 15, and a vehicle-processing apparatus 16.

Various sensors 11 include such as, for example, a speed sensor for detecting a speed based on a wheel speed of the electric vehicle 1 and a yaw rate sensor for detecting the yaw rate of the electric vehicle 1, and outputs a detection result signal, which is relevant to the traveling state of the electric vehicle 1, to the vehicle-processing apparatus 16.

The switch 12 outputs, for example, various signals relevant to traveling control of the electric vehicle 1 to the vehicle-processing apparatus 16.

Various signals output from the switch 12 include such as, for example, a signal relevant to a manipulation state (for example, a manipulation position) of a driver on a brake pedal or an acceleration pedal, various signals (for example, such as a signal for instructing control start or control stop and a signal for instructing an increase or a decrease in target speed or target inter-vehicle distance from a preceding vehicle) relevant to automatic traveling control of automatically controlling the traveling state of the electric vehicle 1 according to a driver's input manipulation, and a signal for instructing to select various driving modes such as an economical driving mode and a regeneration prioritization mode.

The economical driving mode is, for example, a driving mode in which a control instruction to prioritize speed maintenance or acceleration is output when a predictive degree of traffic congestion (predictive information of traffic congestion), which will be described later, indicates a non-congestion tendency, and a control instruction to prioritize deceleration is output when the predictive degree of traffic congestion indicates a congestion tendency.

Additionally, the regeneration prioritization mode is, for example, a driving mode in which a control instruction to prioritize deceleration is output regardless of whether the predictive information of traffic congestion indicates a congestion tendency.

Various actuators 13 include such as, for example, a throttle actuator controlling a driving force of the electric vehicle 1, a brake actuator controlling braking of the electric vehicle 1, and a steering actuator controlling steering of the electric vehicle 1, and are controlled and driven by a control signal output from the vehicle-processing apparatus 16.

Examples of the display 14 include various displays having a display screen such as a liquid crystal display screen, a headup display displaying an image by projection using a front window as a display screen, and various lights, and perform displaying, lighting, or lights-out based on a control signal output from the vehicle-processing apparatus 16.

The speaker 15 outputs a warning sound or audio according to a control signal output from the vehicle-processing apparatus 16.

The display 14 and the speaker 15 may be included in various in-vehicle instruments such as a navigation apparatus.

The vehicle-processing apparatus 16 includes, for example, a calculation processing unit 21, a traveling control unit (an economical driving mode output unit, a control unit, a regeneration prioritization mode output unit) 22, and a notification control unit (an economical driving mode output unit) 23.

The calculation processing unit 21 includes, for example, a present position-detecting unit 31, a map data storage unit 32, an acceleration-calculating unit 33, a frequency-analyzing unit 34, a simple linear regression line-calculating unit 35, a maximum slope value-calculating unit 36, a traffic congestion-predicting unit (an acquisition unit) 37, and an information storage unit 38.

The present position-detecting unit 31 detects the present position of the electric vehicle 1, for example, using a positioning signal received by an antenna 31a that receives the positioning signal such as a GPS (Global Positioning System) signal for measuring the position of the electric vehicle 1 using an artificial satellite.

The present position-detecting unit 31 may detect the present position of the electric vehicle 1 using an autonomous navigation-calculating process based on the speed and the yaw rate of the electric vehicle 1 output from various sensors 11 in parallel.

The map data storage unit 32 stores map data.

The map data includes, for example, road coordinate data representing positional coordinates on a road necessary for a map-matching process based on the present position of the electric vehicle 1 and road data (for example, nodes which are coordinate points including the latitude and the longitude of predetermined positions on a road such as intersections and bifurcations, links which are lines connecting the nodes, road shapes, and road types) necessary for processes such as path search or path guidance.

The acceleration-calculating unit 33 calculates the acceleration of the electric vehicle 1 from the temporal variation in speed or the temporal variation in present position, for example, based on information on the speed of the electric vehicle 1 output from various sensors 11 or information on the present position detected by the present position-detecting unit 31.

The frequency-analyzing unit 34 frequency-analyzes the acceleration of the electric vehicle 1 calculated by the acceleration-calculating unit 33 and calculates the power spectrum corresponding to the frequency.

Figure 2A:
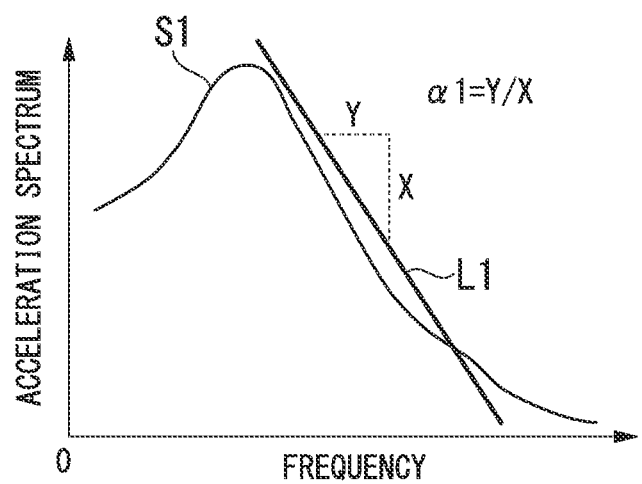
FIG. 2A is a diagram illustrating an example of an acceleration spectrum according to the embodiment of the present invention.
Figure 2B:
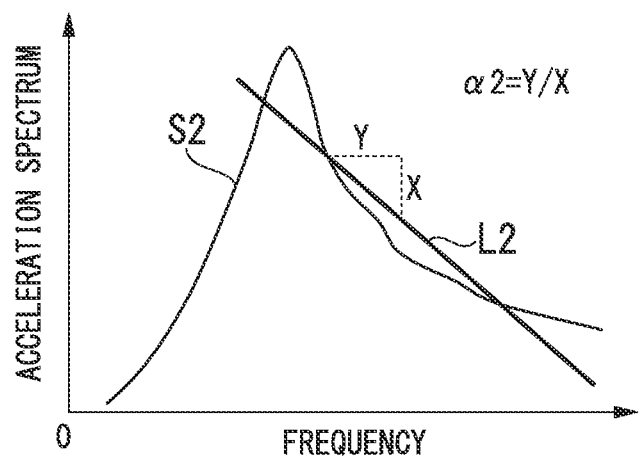
FIG. 2B is a diagram illustrating an example of an acceleration spectrum according to the embodiment of the present invention.

For example, by frequency-analyzing the acceleration values of the electric vehicle 1 detected by the acceleration-calculating unit 33 in two different appropriate traveling states, acceleration spectrums S1 and S2 corresponding to the frequencies are calculated as the power spectrum as shown in FIGS. 2A and 2B.

The simple linear regression line-calculating unit 35 calculates a simple linear regression line in the power spectrums calculated by the frequency-analyzing unit 34.

For example, the simple linear regression lines L1 and L2 are calculated from the acceleration spectrums S1 and S2 shown in FIGS. 2A and 2B.

The maximum slope value-calculating unit 36 calculates the maximum value of a variation in slope of the simple linear regression line within a predetermined frequency range as a maximum slope value with respect to the simple linear regression lines calculated by the simple linear regression line-calculating unit 35.

For example, the maximum slope value-calculating unit 36 calculates the slopes $\alpha 1$ and $\alpha 2$ (=Y/X) with respect to the simple linear regression lines L1 and L2 shown in FIGS. 2A and 2B based on the variation X of spectrum value within a predetermined frequency range Y (for example, a frequency range of 0 to 0.5 Hz corresponding to a time range of several seconds to several minutes).

The traffic congestion-predicting unit 37 calculates a predictive degree of traffic congestion (predictive information of traffic congestion) indicating the possibility of traffic congestion to occur or the possibility of previously-occurring traffic congestion based on the maximum slope value calculated by the maximum slope value-calculating unit 36.

The predictive degree of traffic congestion is, for example, a parameter corresponding to the maximum slope value, increases when the possibility of traffic congestion in the front of the traveling direction of the electric vehicle 1 is high, and decreases when the possibility of traffic congestion is low.

The predetermined threshold value used to determine the magnitude of the predictive degree of traffic congestion can be arbitrarily set, and "−45 degrees" which is known as a (1/f) fluctuation property can be generally used as the predetermined threshold value.

For example, when the absolute value of the slope $\alpha$ of the simple linear regression line calculated by the simple linear regression line-calculating unit 35 is small, this corresponds to a case where shock waves (vibration, fluctuation) received from a preceding vehicle are small and a case where a response delay with respect to the preceding vehicle is small and the inter-vehicle distance is large and difficult to form a vehicle group, that is, the possibility of traffic congestion is low. In this case, the predictive degree of traffic congestion is a small value.

On the contrary, when the absolute value of the slope $\alpha$ is large, this corresponds to a case where shock waves (vibration, fluctuation) received from a preceding vehicle are large and a case where the response delay to the preceding vehicle is large and a vehicle group can be easily dense, that is, the possibility of traffic congestion is high. In this case, the predictive degree of traffic congestion has a large value.

Here, the term shock waves (vibration, fluctuation) represents that, due to the repeatedly accelerating movement and decelerating movement of the vehicle, this movement (forward and backward movement) is propagated as a kind of vibration to a following vehicle.

Therefore, the traffic congestion-predicting unit 37 calculates a predictive degree of traffic congestion based on the magnitude of the slope $\alpha$ of the simple linear regression line calculated by the simple linear regression line-calculating unit 35, more specifically, the maximum slope value calculated by the maximum slope value-calculating unit 36.

For example, the traffic congestion-predicting unit 37 calculates a function (for example, y=ax+b) representing the relationship between the maximum slope value (x) and the predictive degree of traffic congestion (y) in advance and calculates the traffic congestion signal value (y) with respect to the maximum slope value (x) calculated by the maximum slope value-calculating unit 36.

The traffic congestion-predicting unit 37 may prepare and store the relationship between the maximum slope value and the predictive degree of traffic congestion corresponding thereto as a table in the information storage unit 38 in advance, and may calculate the predictive degree of traffic congestion with respect to the calculated maximum slope value referring to the table.

The traffic congestion-predicting unit 37 prepares driving support information representing driving support necessary for traffic congestion avoidance or traffic congestion release for the electric vehicle 1 based on the calculated predictive degree of traffic congestion and the map data stored in the map data storage unit 32.

The driving support information is, for example, information used for traveling control of the electric vehicle 1 so as to prevent occurrence of traffic congestion or notifying to a driver from the display 14 or the speaker 15 of the electric vehicle 1.

More specifically, for example, the driving support information includes information of a target speed or target inter-vehicle distance in automatic traveling control necessary for traffic congestion avoidance or traffic congestion release for the electric vehicle 1, information of a predetermined driving manipulation such as an increase in inter-vehicle distance from a preceding vehicle or suppression of an accelerating action, and information of path search or path guidance for the electric vehicle 1.

The information storage unit 38 stores the predictive degree of traffic congestion and the driving support information sequentially prepared by the traffic congestion-predicting unit 37.

The traveling control unit 22 controls the traveling of the electric vehicle 1, for example, by controlling the driving of the throttle actuator, the brake actuator, and the steering actuator based on the predictive degree of traffic congestion and the driving support information calculated by the traffic congestion-predicting unit 37, various signals output from the switch 12, and the signals of detection result according to the traveling state of the electric vehicle 1 output from various sensors 11.

For example, the traveling control unit 22 starts or stops execution of the automatic traveling control, or sets or changes the target speed or the target inter-vehicle distance in the automatic traveling control, based on the signals output from the switch 12.

For example, when the economical driving mode is selected by a driver in response to the signals output from the switch 12, the traveling control unit 22 outputs a control instruction to prioritize speed maintenance or acceleration when the predictive degree of traffic congestion calculated by the traffic congestion-predicting unit 37 indicates a non-congestion tendency, and outputs a control instruction to prioritize deceleration when the predictive degree of traffic congestion indicates a congestion tendency.

For example, when the regeneration prioritization mode is selected by the driver in response to the signals output from the switch 12, the traveling control unit 22 outputs a control instruction to prioritize deceleration regardless of whether the predictive degree of traffic congestion indicates the congestion tendency.

The congestion tendency indicated by the predictive degree of traffic congestion is a tendency of non-rectify of a traffic flow, and, for example, corresponds to a case where the absolute value of the maximum slope value calculated by the maximum slope value-calculating unit 36 is larger than a predetermined range (for example, a range of 30° to 45°), and represents that the possibility of traffic congestion to occur in front of the traveling direction of the electric vehicle 1 is high (or that the possibility of previously-occurring traffic congestion is high).

On the other hand, the non-congestion tendency indicated by the predictive degree of traffic congestion is a tendency of rectify of a traffic flow, and, for example, corresponds to a case where the absolute value of the maximum slope value calculated by the maximum slope value-calculating unit 36 is smaller than a predetermined range (for example, a range of 30° to 45°), and represents that the possibility of traffic congestion to occur in front of the traveling direction of the electric vehicle 1 is low (or that the possibility of previously-occurring traffic congestion is low).

That is, when there is a non-congestion tendency during the economical driving mode, the traveling control unit 22 instructs prioritization of maintenance of the present speed or prioritization of acceleration for avoiding formation of a vehicle group so as to cause the electric vehicle 1 to avoid traffic congestion and cause a following vehicle of the electric vehicle 1 to make it difficult to cause traffic congestion, or to release the traffic congestion of the surrounding of the electric vehicle 1.

On the other hand, when there is a congestion tendency during the economical driving mode, the traveling control unit 22 instructs prioritization of deceleration so as to obtain regenerated energy by performing deceleration to correspond to the traffic flow, instead of losing energy due to speed maintenance or acceleration.

The traveling control unit 22 controls the driving of the electric vehicle 1, for example, by outputting a control instruction to change various parameters relevant to the operations of various actuators 13 or outputting a control instruction to change the target speed or the target inter-vehicle distance necessary for the automatic traveling control (for example, constant-speed traveling control of matching the actual speed with the target speed or inter-vehicle distance control or following traveling control of matching the actual inter-vehicle distance from another vehicle such as a preceding vehicle with the target inter-vehicle distance) as the control instruction to prioritize speed maintenance or acceleration or the control instruction to prioritize deceleration.

The notification control unit 23 controls various notification operations by controlling the display 14 and the speaker 15 based on the predictive degree of traffic congestion and the driving support information calculated by the traffic congestion-predicting unit 37 and various signals output from the switch 12.

For example, the notification control unit 23 can display a variation of the traffic congestion signal value sequentially calculated by the traffic congestion-predicting unit 37 in time series. In the display example shown in FIGS. 3A and 3B, the history of the predictive degree of traffic congestion calculated by the traffic congestion-predicting unit 37 from the present time to a predetermined past time is displayed in a display mode (for example, a so-called analog display such as a bar graph having a height and a display color corresponding to the predictive degree of traffic congestion) corresponding to the magnitude of the predictive degree of traffic congestion.

Figure 3A:
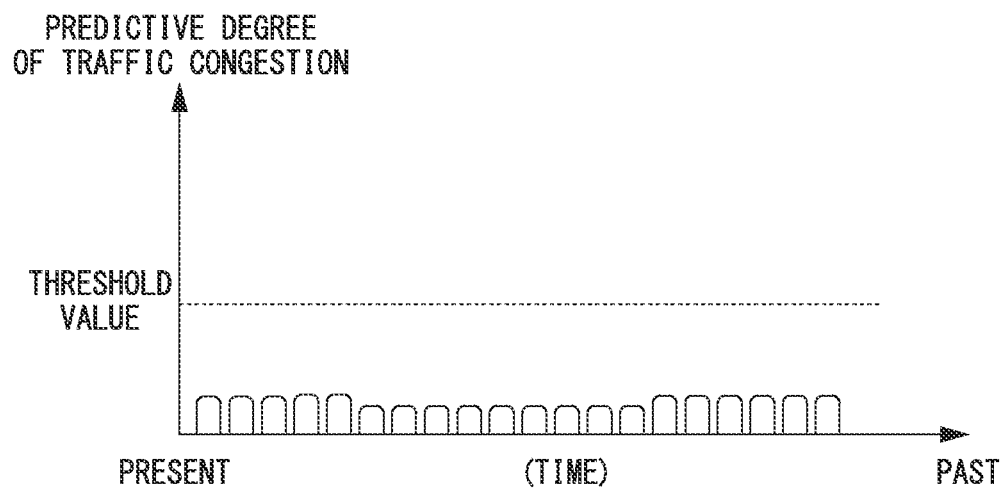
FIG. 3A is a diagram illustrating a display example of a display of the electric vehicle driving support system according to the embodiment of the present invention.

When the economical driving mode is selected by a driver in response to the signals output from the switch 12 and the predictive degree of traffic congestion calculated by the traffic congestion-predicting unit 37 indicates a non-congestion tendency, the notification control unit 23 displays a predictive degree of traffic congestion smaller than a predetermined threshold value in a predetermined display color (for example, green indicating that speed maintenance or acceleration is prioritized), for example, as shown in FIG. 3A.

Figure 3B:
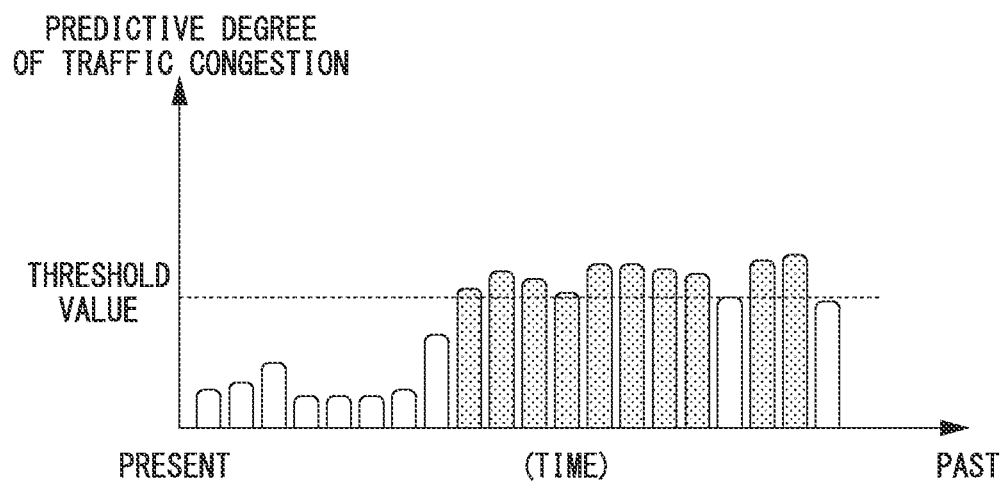
FIG. 3B is a diagram illustrating a display example of a display of the electric vehicle driving support system according to the embodiment of the present invention.

On the other hand, when the predictive degree of traffic congestion indicates a congestion tendency, the notification control unit 23 displays a predictive degree of traffic congestion larger than a predetermined threshold value in a predetermined display color (for example, red indicating that deceleration is prioritized), for example, as shown in FIG. 3B.

That is, when there is a non-congestion tendency in the economical driving mode, the notification control unit 23 notifies the instruction to prioritize maintenance of the present speed or to prioritize acceleration for avoiding formation of a vehicle group so as to cause the electric vehicle 1 to avoid traffic congestion and cause a following vehicle of the electric vehicle 1 to make it difficult to cause traffic congestion or to release the traffic congestion of the surrounding of the electric vehicle 1.

On the other hand, when there is a congestion tendency in the economical driving mode, the notification control unit 23 notifies the instruction to prioritize deceleration so as to obtain regenerated energy by performing deceleration to correspond to the traffic flow, instead of losing energy due to speed maintenance or acceleration.

The notification control unit 23 is not limited to, for example, the graphs shown in FIGS. 3A and 3B. For example, a message directly instructing prioritization of speed maintenance or acceleration or prioritization of deceleration may be displayed, or prioritization of speed maintenance or acceleration or prioritization of deceleration may be so-called indirectly instructed by an appropriate lighting display, a flickering display, or the like.

The notification control unit 23 controls, for example, the output of a warning sound or voice from the speaker 15 to notify the instruction of a driving manipulation (such as instructions to prioritize speed maintenance or acceleration or to prioritize deceleration and an instruction of a target speed or a target inter-vehicle distance).

For example, when the regeneration prioritization mode is selected by a driver in response to the signals output from the switch 12, the notification control unit 23 notifies the instruction to prioritize deceleration using the display 14 and the speaker 15, regardless of whether the predictive degree of traffic congestion indicates a congestion tendency.

The electric vehicle driving support system 10 according to this embodiment has the above-mentioned configuration, and the operation of the electric vehicle driving support system 10 will be described below.

Figure 4:
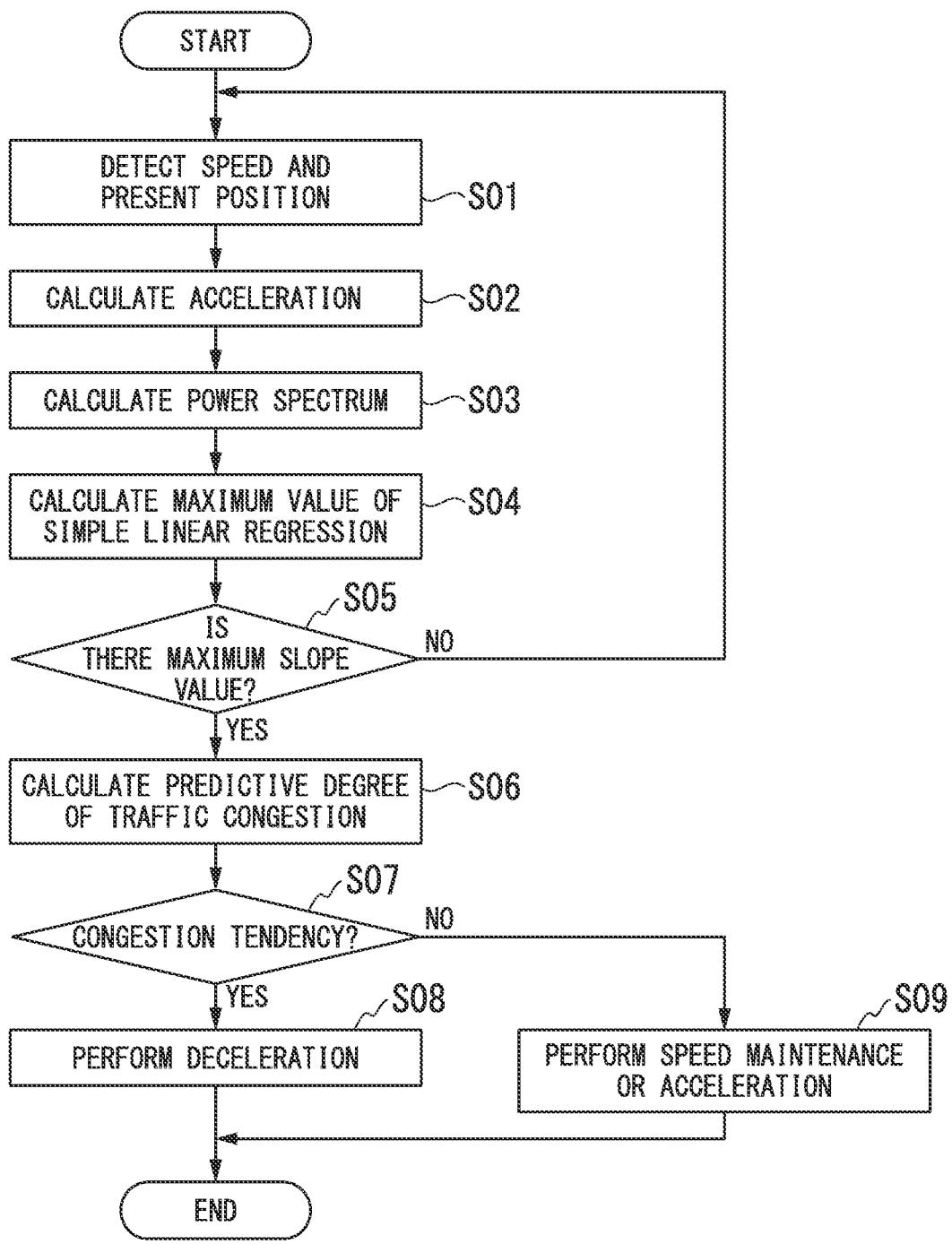
FIG. 4 is a flowchart illustrating a flow of operations of the electric vehicle driving support system according to the embodiment of the present invention.

First, for example, in step S01 shown in FIG. 4, the speed of the electric vehicle 1 is detected using the speed sensor of various sensors 11, and the present position of the electric vehicle 1 is detected using the present position-detecting unit 31.

Then, in step S02, the acceleration of the electric vehicle 1 is calculated from the temporal variation in speed or the temporal variation in the present position based on the speed or the present position of the electric vehicle 1.

In step S03, the acceleration of the electric vehicle 1 is frequency-analyzed to calculate the power spectrum corresponding to the frequency.

Then, in step S04, the simple linear regression line is calculated in the power spectrum, and the maximum value of the variation in slope of the simple linear regression line within a predetermined frequency range is calculated as the maximum slope value (calculation of the maximum value of simple linear regression).

In step S05, it is determined whether the maximum slope value (for example, the maximum slope value equal to or greater than a predetermined value) is calculated.

When the determination result is "NO", the process of step S01 is performed again.

On the other hand, when the determination result is "YES", the process of step S06 is performed.

In step S06, the predictive degree of traffic congestion representing the possibility of traffic congestion to occur or the possibility of previously-occurring traffic congestion is calculated based on the absolute value of the maximum slope value.

Then, in step S07, it is determined whether the calculated predictive degree of traffic congestion indicates a congestion tendency, for example, depending on whether the absolute value of the maximum slope value is greater than a predetermined range (for example, such as a range of 30° to 45°).

When the determination result is "YES", the process of step S08 is performed. In step S08, a control instruction to prioritize deceleration is output and then the flow of operations is ended.

On the other hand, when the determination result is "NO", the process of step S09 is performed. In step S09, a control instruction to prioritize speed maintenance or acceleration is output and then the flow of operations is ended.

As described above, in the electric vehicle driving support system 10 according to this embodiment, it is possible to improve driving efficiency of an electric vehicle 1 having small energy output, for example, compared with a vehicle having an internal combustion engine as a traveling drive source, by controlling traveling pattern in detail in consideration of comprehensive energy balance due to the difference in traveling state of the electric vehicle 1 depending on the predictive degree of traffic congestion indicates a non-congestion tendency or a congestion tendency.

That is, by prioritizing maintenance of the present speed or prioritizing acceleration so as to avoid formation of a vehicle group when the predictive degree of traffic congestion indicates a non-congestion tendency in the economical driving mode, it is possible to avoid traffic congestion and to enable a desired traveling with a slow variation in speed, thereby improving electrical energy efficiency.

On the other hand, by prioritizing deceleration necessary for corresponding to a traffic flow when the predictive degree of traffic congestion indicates a congestion tendency in the economical driving mode, it is possible to recover regenerated energy and thus to realize economical driving in comprehensive energy balance, for example, compared with a case where energy is lost due to speed maintenance or acceleration.

Additionally, by displaying history of the predictive degree of traffic congestion as information for supporting economical driving in an analog manner in the economical driving mode, it is possible to urge a driver to perform an economical driving manipulation.

Additionally, by automatically controlling the traveling of the electric vehicle 1 depending on whether the predictive degree of traffic congestion indicates a non-congestion tendency or a congestion tendency in the economical driving mode, it is possible to perform the optimal driving manipulation in comprehensive energy balance and thus to more easily realize economical driving.

Additionally, by allowing a driver to select various driving modes such as the economical driving mode and the regeneration prioritization mode, it is possible to enable regeneration-prioritized traveling of increasing the cruising range regardless of the predictive degree of traffic congestion and thus to realize economical driving.

Figure 5:
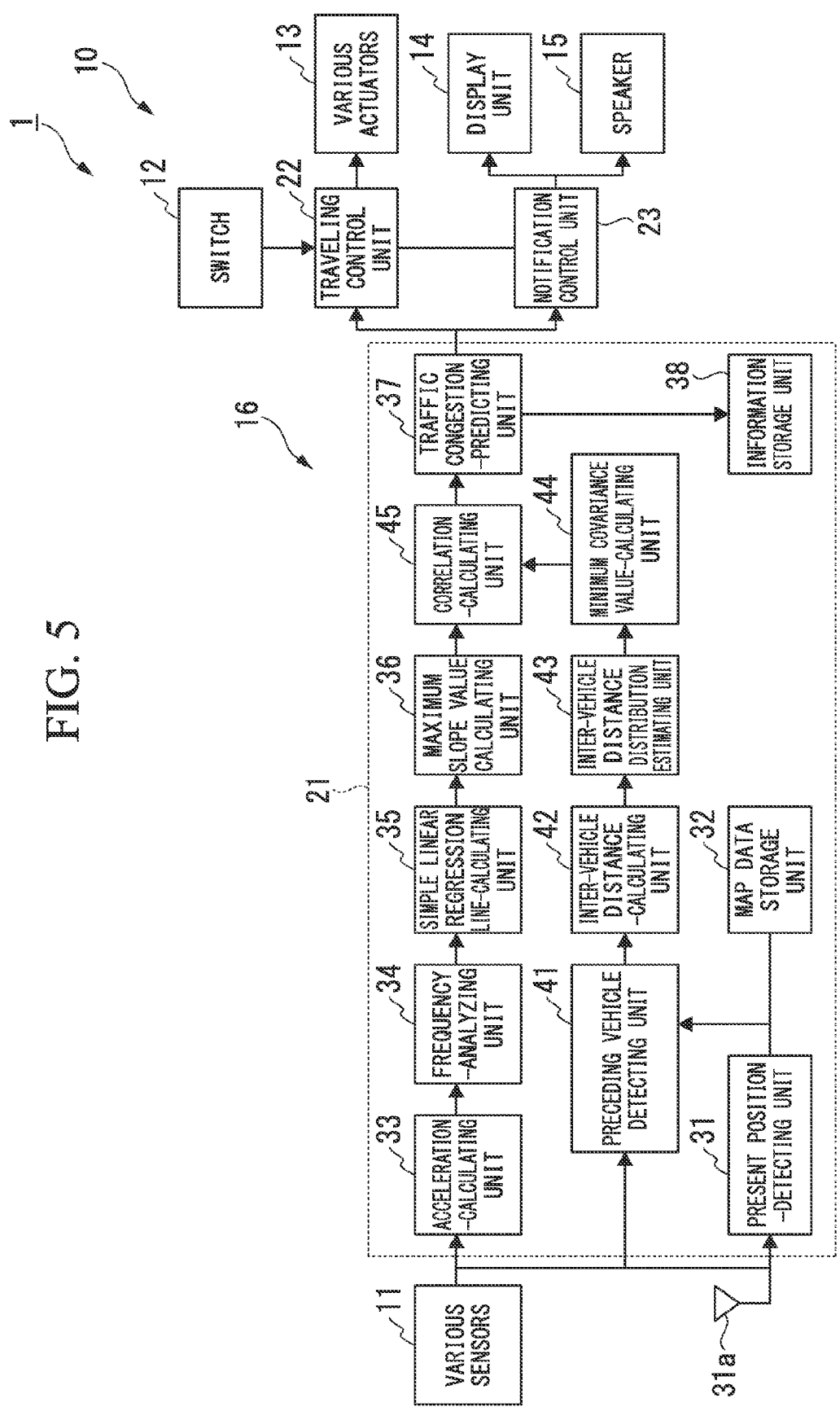
FIG. 5 is a diagram illustrating the configuration of an electric vehicle equipped with an electric vehicle driving support system according to a modified example of the embodiment of the present invention.

In the above-mentioned embodiment, for example, like an electric vehicle 1 according to a modified example shown in FIG. 5, a traffic congestion-predicting calculation may be performed based on the inter-vehicle distance information between the electric vehicle 1 and a preceding vehicle in addition to the acceleration of the electric vehicle 1.

The configuration of the electric vehicle 1 according to this modified example is different from the configuration of the electric vehicle 1 according to the above-mentioned embodiment, for example, in that the calculation processing unit 21 additionally includes a preceding vehicle-detecting unit 41, an inter-vehicle distance-calculating unit 42, an inter-vehicle distance distribution-estimating unit 43, a minimum covariance value-calculating unit 44, and a correlation-calculating unit 45 and an external surrounding sensor such as a radar apparatus or an imaging apparatus detecting an external surrounding of the electric vehicle 1 are added as the various sensors 11.

That is, the calculation processing unit 21 of the electric vehicle 1 according to the modified example includes, for example, the present position-detecting unit 31, the map data storage unit 32, the acceleration-calculating unit 33, the frequency-analyzing unit 34, the simple linear regression line-calculating unit 35, the maximum slope value-calculating unit 36, the traffic congestion-predicting unit 37, the information storage unit 38, the preceding vehicle-detecting unit 41, the inter-vehicle distance-calculating unit 42, the inter-vehicle distance distribution-estimating unit 43, the minimum covariance value-calculating unit 44, and the correlation-calculating unit 45.

The radar apparatus divides a detection target area set in the external surrounding (the external surrounding in the front of the traveling direction and the like) of the electric vehicle 1 into plural angle areas, scans the respective angle areas, and emits emission signals of electromagnetic waves. Then, the radar apparatus receives reflection signals of reflected waves obtained by reflection of the emission signals from an external object (for example, a preceding vehicle and the like) or a pedestrian outside the electric vehicle 1. A signal corresponding to the emission signals and the reflection signals, that is, a detection signal according to a distance from the radar apparatus to the external object or the pedestrian, is generated and the generated detection signal is output.

Additionally, for example, the imaging apparatus includes a camera, performs a predetermined image process on an image obtained by imaging an imaging area set in the external surrounding (the external surrounding in front of the traveling direction or the like) of the electric vehicle 1, generates image data (for example, a moving image or plural intermittent still images of a time series and the like), and outputs the generated image data.

The preceding vehicle-detecting unit 41 detects preceding vehicles present in front of the traveling direction of the electric vehicle 1 based on the signal output from the external surrounding sensor.

The inter-vehicle distance-calculating unit 42 detects inter-vehicle distances from each of preceding vehicles of the electric vehicle 1 detected by the preceding vehicle-detecting unit 41.

The inter-vehicle distance distribution-estimating unit 43 estimates an inter-vehicle distance distribution based on the inter-vehicle distances between the electric vehicle 1 and each of preceding vehicles detected by the inter-vehicle distance-calculating unit 42 and the number of preceding vehicles detected.

For example, when vehicle groups (that is, sets of preceding vehicles of which the inter-vehicle distances are relatively dense) in front of the electric vehicle 1 are detected from the information of the inter-vehicle distances and the number of vehicles, the inter-vehicle distance distribution-estimating unit 43 applies a Gaussian distribution (probability density distribution) on each vehicle groups using a distribution estimating method such as a variational Bayesian method.

For example, when two vehicle groups are detected, the two vehicle groups can be understood as a distribution in which two Gaussian distributions are linearly combined. For example, as shown in FIG. 6, a probability function P(X) representing the total distribution is obtained as the sum (superposition) of probability functions P1(X) and P2(X) representing two Gaussian distributions.

Figure 6:
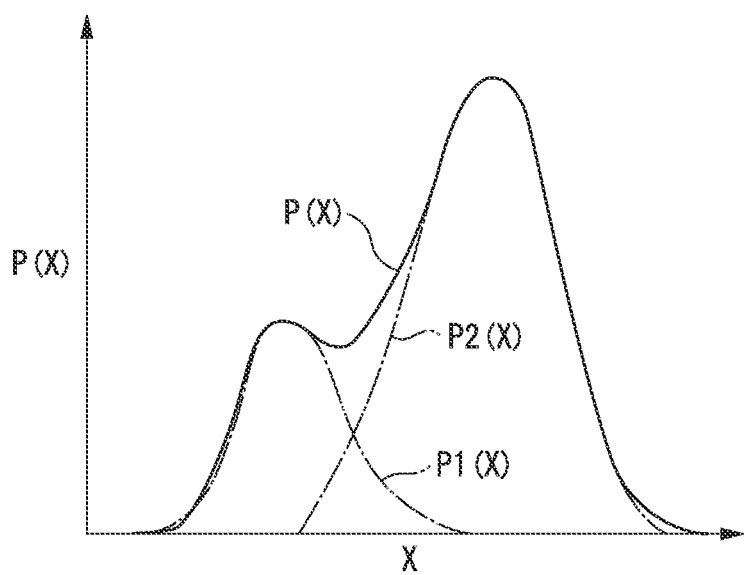
FIG. 6 is a diagram illustrating an example of a probability density distribution according to a modified example of the embodiment of the present invention.

Here, when the Gaussian distribution (probability function) is expressed by $N(x|\mu,\Sigma)$, the superposition of plural Gaussian distributions shown in FIG. 6 is described by Expression 1.

Expression 1

$$p(x) = \sum_{k=1}^{K} \pi_k N(x|\mu_k, \Sigma_k) \quad (1)$$

In Expression 1, an expected value (average value) $\mu_k$ represents a position having the highest density, where k is a natural number. A covariance value (matrix) $\Sigma_k$ represents distortion of the distribution, that is, how the density decreases when in what direction from the expected value $\mu_k$ it gets away. The combination coefficient (combination ratio) $\pi_k$ ($0 \le \pi_k \le 1$) of the Gaussian distributions represents how the respective Gaussian distributions contribute and is expressed as so-called probability.

For example, the minimum covariance value-calculating unit 44 performs a calculation process using a variational Bayesian method or the like to calculate the parameter (covariance) in which the likelihood function obtained from the probability function P(X) is the maximum.

For example, the minimum covariance value-calculating unit 44 calculates the covariance value $\Sigma_k$ for each Gaussian distribution in the probability function P(X) obtained by superposing plural Gaussian distributions as shown in FIG. 6. Then, the minimum value of the plural covariance values $\Sigma_k$ obtained for the respective Gaussian distributions is calculated.

Figure 7A:
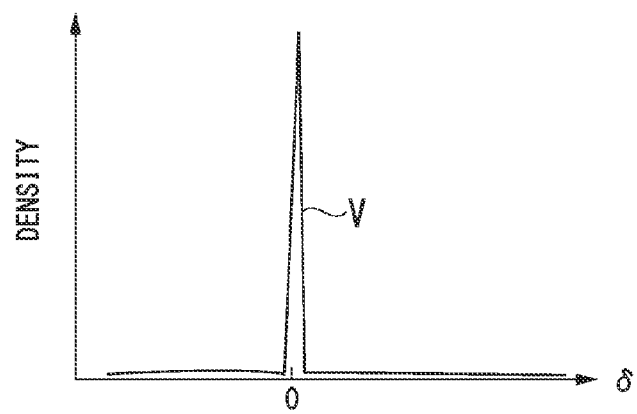
FIG. 7A is a diagram illustrating an example of a distribution of covariance value according to a modified example of the embodiment of the present invention.

For example, in the graph V of a distribution of the covariance value $\Sigma_k$ shown in FIG. 7A, the graph is sharp at variable $\delta=0$, whereby $\delta$ represents a variable (for example, the covariance value $\Sigma_k$ itself and the like) relevant to the covariance value $\Sigma_k$, which indicates a traveling state in which vehicle groups hardly varies, that is, the inter-vehicle distances are almost constant.

Figure 7B:
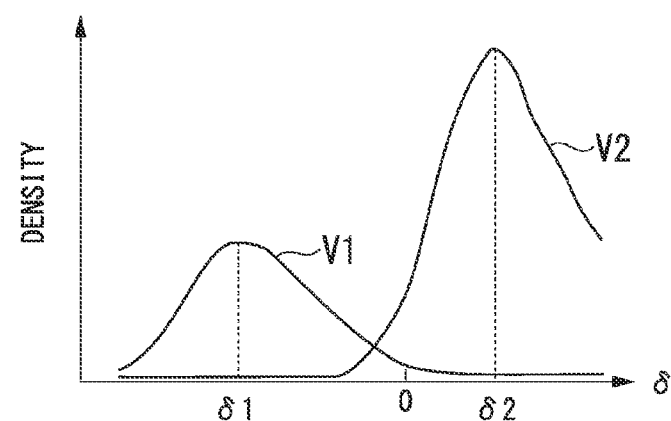
FIG. 7B is a diagram illustrating an example of a distribution of covariance value according to a modified example of the embodiment of the present invention.

On the other hand, the distribution of the covariance value $\Sigma_k$ shown in FIG. 7B is constructed by two graphs of graph V1 having a peak at a value $\delta 1$ in the negative region of variable $\delta$ relevant to the covariance value $\Sigma_k$ and graph V2 having a peak at a value $\delta 2$ of the positive region. Graphs V1 and V2 have a predetermined fluctuation range for variable $\delta$ relevant to the covariance value $\Sigma_k$, and represent that plural sets of vehicles 2 having a variation in vehicle group, that is, having different inter-vehicle distances, exist.

For example, in FIG. 7A, the minimum value (minimum covariance value) of the covariance value $\Sigma_k$ is almost zero. For example, in FIG. 7B, the minimum value of the covariance value $\Sigma_k$ is the value $\delta 1$ which is the smaller of two values $\delta 1$ and $\delta 2$.

The correlation-calculating unit 45 prepares a correlation map of the maximum slope value calculated by the maximum slope value-calculating unit 36 and the minimum covariance value calculated by the minimum covariance value-calculating unit 44.

Figure 8:
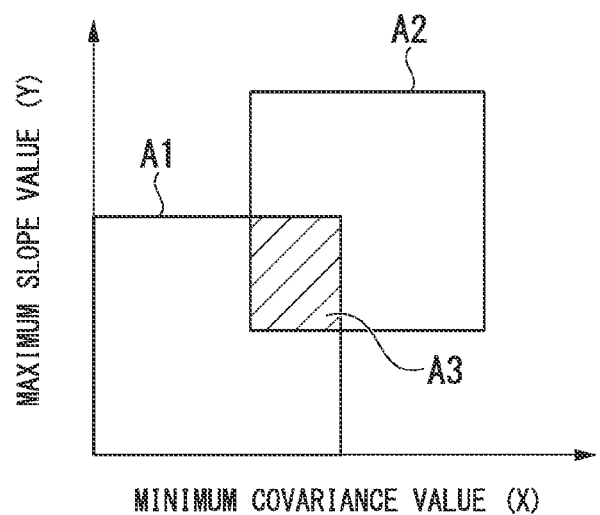
FIG. 8 is a diagram illustrating an example of a correlation map of the minimum covariance value and the maximal slope value according to a modified example of the embodiment of the present invention.

For example, in the image (concept) of the correlation map of the maximum slope value and the minimum covariance value shown in FIG. 8, the horizontal (X) axis represents the minimum variance value X, the vertical (Y) axis represents the maximum slope value Y, and the correlation of variables (X, Y) is mapped.

For example, in the correlation map shown in FIG. 8, two areas A1 and A2 are present and a boundary area A3 in which the two areas A1 and A2 overlap is present. The area A1 corresponds to a state where the minimum covariance value is relatively small and the variation in vehicle group is small, that is, a state where the inter-vehicle distance is relatively constant. On the contrary, the area A2 corresponds to a state where the minimum covariance value is relatively large and the variation in vehicle group is large, that is, a state where plural sets of vehicles having different inter-vehicle distances are present.

The boundary area A3 is an area in which the small variation in vehicle group is transitioned to the large variation in vehicle group. It is possible to predict the traffic congestion by quantitatively finding the vehicle group state corresponding to the boundary area A3.

Figure 9:
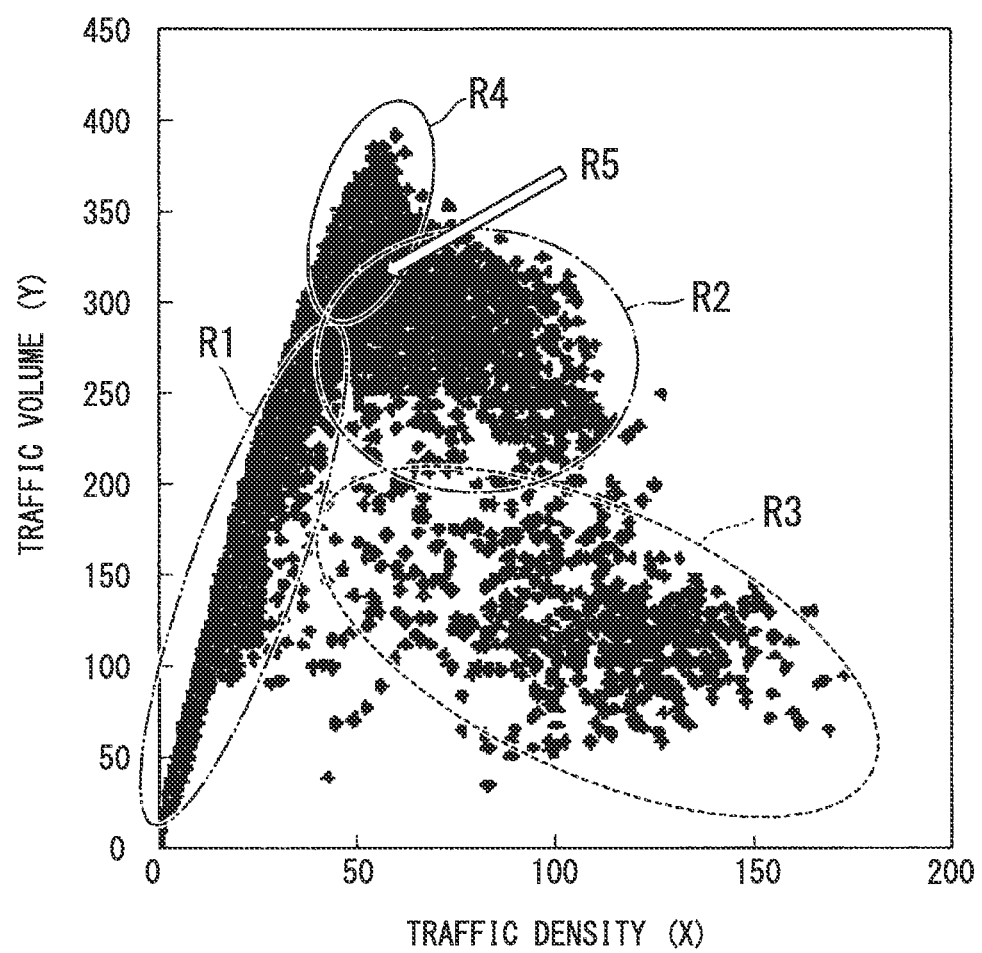
FIG. 9 is a diagram illustrating a relationship between a traffic density and a traffic volume according to a modified example of the embodiment of the present invention.

For example, in the diagram illustrating the relationship between a traffic density and a traffic volume as shown in FIG. 9, the horizontal (X) axis of the graph represents a traffic density indicating the number of vehicles present within a predetermined distance from a specific vehicle, and the reciprocal of the traffic density corresponds to the inter-vehicle distance. The vertical (Y) axis represents a traffic volume indicating the number of vehicles passing through a predetermined position.

For example, it can be understood that the diagram illustrating the relationship between the traffic density and the traffic volume as shown in FIG. 9 represents the traffic flow indicating a flow of vehicles.

The traffic flow shown in FIG. 9 can be approximately partitioned into four states (areas).

A first state (a natural flow state) R1 is a free flow state in which the possibility of occurrence of traffic congestion is low. Acceleration higher than a predetermined value and an inter-vehicle distance can be secured herein.

A second state (a mixed flow state) R2 is a mixed flow state in which braking states and accelerating states of vehicles are mixed. This mixed flow state is a state before transition to a traffic congested flow and is a state where the degree of freedom of driving by a driver is lowered and the probability of transition to a traffic congested flow is high due to an increase in traffic density (a decrease in inter-vehicle distance).

A third state (a traffic congested flow state) is a traffic congested flow state representing traffic congestion.

A fourth state (critical area) R4 is a critical area which is a transition state present in the course of transition from the free flow state to the mixed flow state. The critical area is a state in which the traffic volume and the traffic density are higher than those of the free flow and is a state in which the traffic flow transitions to the mixed flow due to a decrease in traffic volume and an increase in traffic density (a decrease in inter-vehicle distance). The critical area is also referred to as a quasi-stable flow or a metastable flow.

For example, the area A1 shown in FIG. 8 includes the free flow and the critical area shown, for example, in FIG. 9. For example, the area A2 shown in FIG. 8 includes the mixed flow and the congested flow shown, for example, in FIG. 9.

Therefore, for example, the boundary area A3 shown in FIG. 8 is a boundary state including both the critical area and the mixed flow state shown, for example, in FIG. 9, and is a boundary R5 of the critical area shown, for example, in FIG. 9.

By quantitatively understanding the critical area including the boundary R5 of the critical area, it is possible to suppress transition to the mixed flow state and thus to prevent occurrence of traffic congestion.

Figure 10:
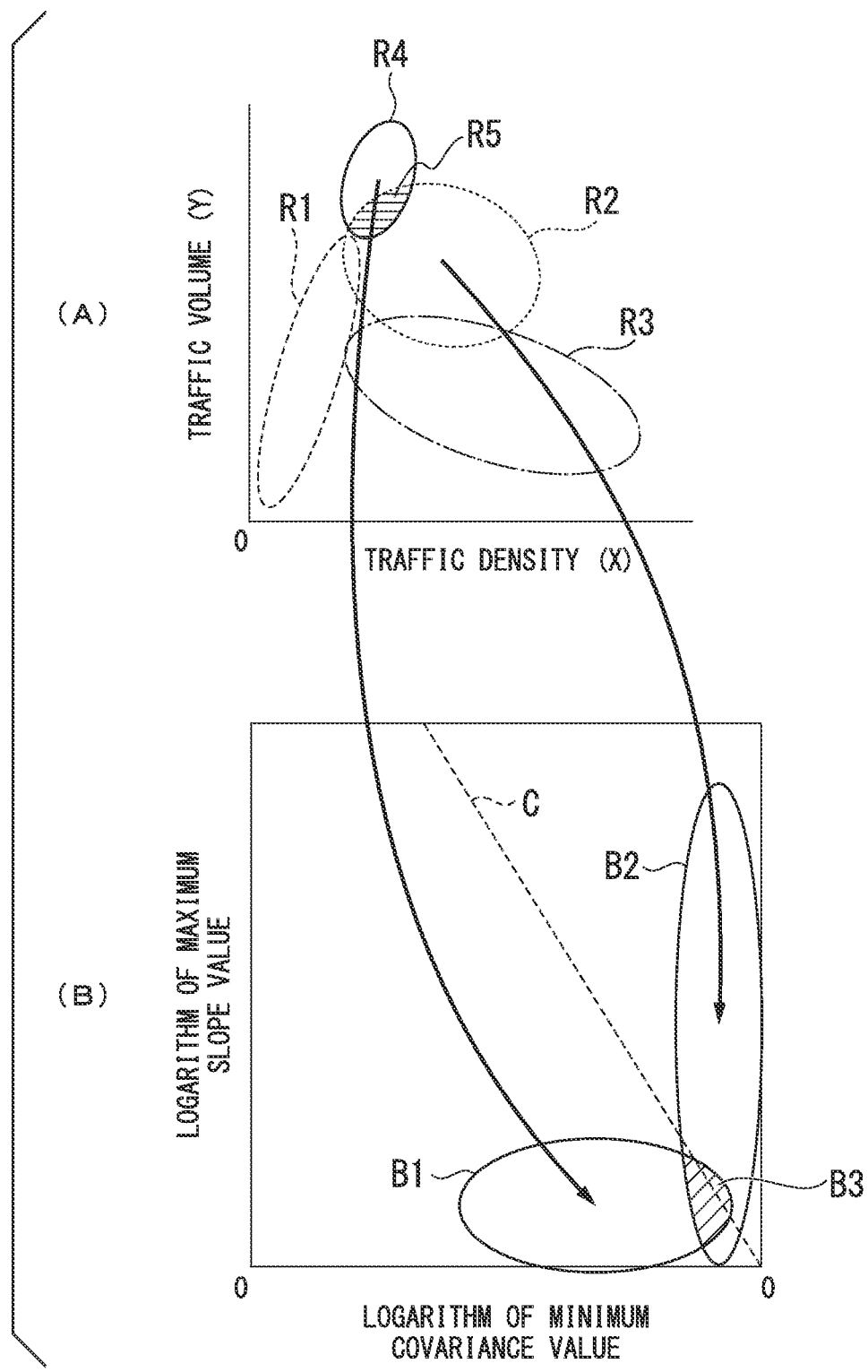
FIG. 10 is a diagram illustrating an example of a correlation map of a logarithm of the minimum covariance value with respect to the inter-vehicle distance distribution and a logarithm of the maximum slope value with respect to an acceleration spectrum according to a modified example of the embodiment of the present invention.

The quantification of the critical area will be described below, for example, referring to FIG. 10 illustrating the correlation map of the logarithm of the minimum covariance value with respect to the inter-vehicle distance distribution and the logarithm of the maximum slope value with respect to the acceleration spectrum.

FIG. 10(A) is a diagram briefly illustrating the map of the traffic flow shown in FIG. 9 and FIG. 10(B) illustrates the correlation map of the logarithm of the minimum covariance value and the logarithm of the maximum slope value.

The logarithm of the minimum covariance value and the logarithm of the maximum slope value shown in FIG. 10(B) are calculated as the logarithmic values of the maximum slope value calculated by the maximum slope value-calculating unit 36 and the minimum covariance value calculated by the minimum covariance value-calculating unit 44, and depict conversion of a phase transition state into a parameter in the critical area R4.

For example, in FIG. 10(B), the area B1 includes the critical area R4 shown in FIG. 10(A) and the area B2 includes the mixed flow state R2 shown in FIG. 10(A). The critical line C represents a critical point at which the possibility of traffic congestion is high when the traffic flow goes over the critical line and transitions to the mixed flow state. The boundary area B3 of the areas B1 and B2 corresponds to the boundary R5 of the critical area just before the critical line C.

The correlation map shown in FIG. 10(B) is stored in the information storage unit 38 of the vehicle processing apparatus 16.

The traffic congestion-predicting unit 37 according to this modified example determines whether the boundary state of the critical area is present in the correlation map prepared by the correlation-calculating unit 45, and calculates the predictive degree of traffic congestion (predictive information of traffic congestion) based on the determination result. When the boundary state of the critical area is present in the correlation map, driving support information is prepared referring to the map data stored in the map data storage unit 32 so as to prevent transition to the traffic congestion.

The predictive degree of traffic congestion in this modified example represents a case where the possibility of occurrence of traffic congestion (the predictive degree of traffic congestion) is higher than a predetermined threshold value, for example, when the boundary state of the critical area is present in the correlation map. Additionally, the predictive degree of traffic congestion in this modified example represents a case where the possibility of occurrence of traffic congestion (the predictive degree of traffic congestion) is lower than a predetermined threshold value when the boundary state of the critical area is not present in the correlation map.

The electric vehicle 1 according to this modified example has the above-mentioned configuration. The operation of the vehicle processing apparatus 16 of the electric vehicle 1 will be described below.

Figure 11:
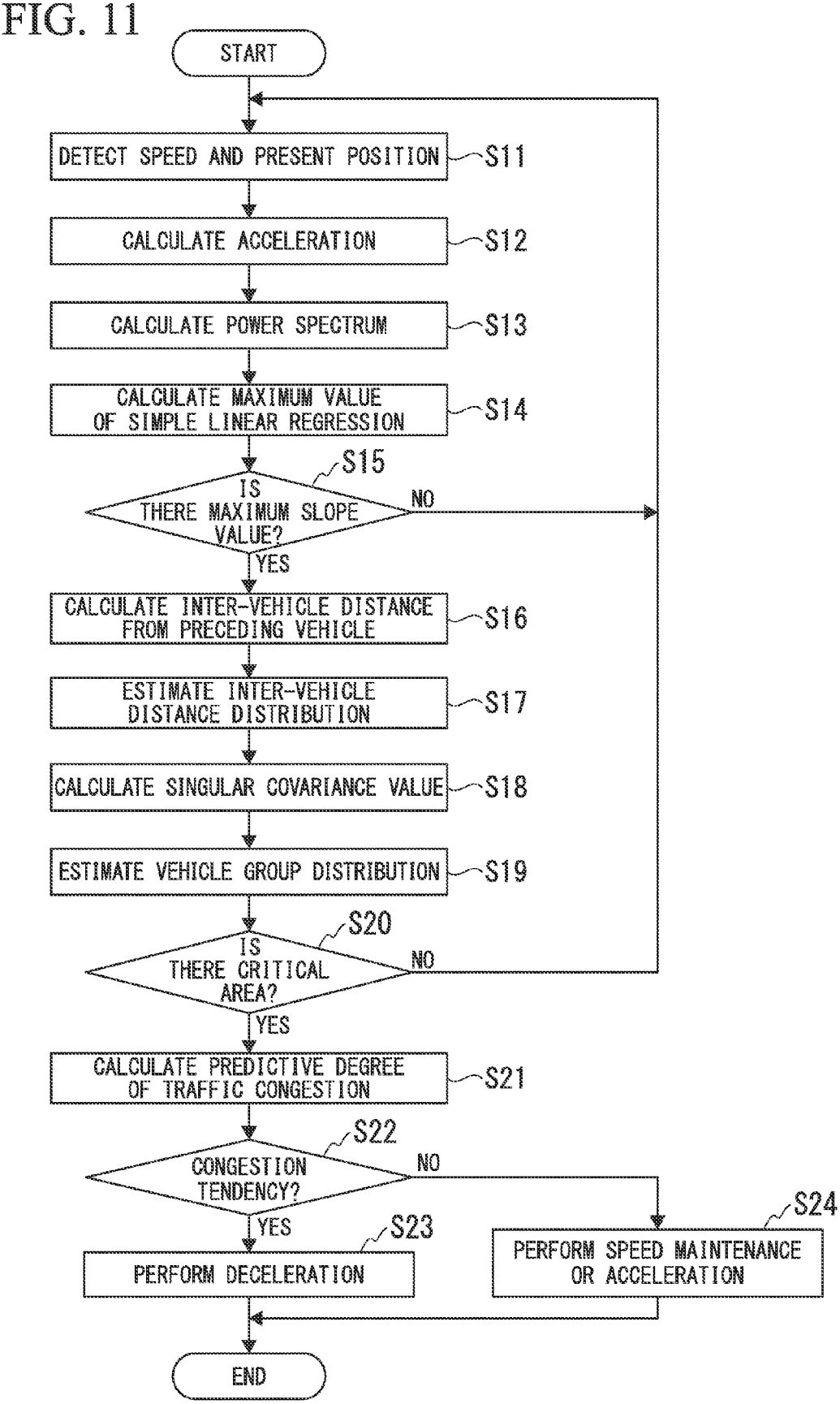
FIG. 11 is a flowchart illustrating a flow of operations of an electric vehicle driving support system according to a modified example of the embodiment of the present invention.

First, for example, in step S11 shown in FIG. 11, the speed of the electric vehicle 1 is detected using the speed sensor of various sensors 11, and the present position of the electric vehicle 1 is detected using the present position-detecting unit 31.

Then, in step S12, the acceleration of the electric vehicle 1 is calculated from the temporal variation in speed or the temporal variation in the present position based on the speed or the present position of the electric vehicle 1.

In step S13, the acceleration of the electric vehicle 1 is frequency-analyzed to calculate the power spectrum corresponding to the frequency.

Then, in step S14, the simple linear regression line is calculated in the power spectrum, and the maximum value of the variation in slope of the simple linear regression line within a predetermined frequency range is calculated as the maximum slope value (calculation of the maximum value of simple linear regression).

In step S15, it is determined whether the maximum slope value (for example, the maximum slope value equal to or greater than a predetermined value) is calculated.

When the determination result is "NO", the process of step S11 is performed again.

On the other hand, when the determination result is "YES", the process of step S16 is performed.

Then, in step S16, preceding vehicles present in front of the traveling direction of the electric vehicle 1 are detected and the inter-vehicle distances of the electric vehicle 1 from the preceding vehicles are calculated.

In step S17, the inter-vehicle distance distribution is estimated based on the inter-vehicle distances of the electric vehicle 1 from the preceding vehicles and the number of preceding vehicles detected.

Then, in step S18, the minimum covariance value is calculated from the inter-vehicle distance distribution (calculation of a singular covariance value)

In step S19, the vehicle group distribution in front of the traveling direction of the electric vehicle 1 is estimated from the correlation between the minimum covariance value and the maximum slope value.

In step S20, it is determined whether the boundary state of the critical area is present in the correlation map of the minimum covariance value and the maximum slope value of the acceleration spectrum.

When the determination result is "NO", the process of step S11 is performed again.

On the other hand, when the determination result is "YES", the process of step S21 is performed.

In step S21, the predictive degree of traffic congestion representing the possibility of traffic congestion to occur or the possibility of previously-occurring traffic congestion is calculated based on the maximum slope value.

Then, in step S22, it is determined whether the calculated predictive degree of traffic congestion indicates a congestion tendency, for example, depending on whether the absolute value of the maximum slope value is greater than a predetermined range (for example, a range of 30° to 45° and the like).

When the determination result is "YES", the process of step S23 is performed. In step S23, a control instruction to prioritize deceleration is output and then the flow of operations is ended.

On the other hand, when the determination result is "NO", the process of step S24 is performed. In step S24, a control instruction to prioritize speed maintenance or acceleration is output and then the flow of operations is ended.

In the electric vehicle driving support system 10 according to this modified example, by combining the information, which can be easily acquired, such as the inter-vehicle distances between the electric vehicle 1 and the preceding vehicles, in addition to the acceleration of the electric vehicle 1 to calculate the predictive degree of traffic congestion, it is possible to improve the accuracy and reliability of calculation of the predictive degree of traffic congestion and thus to more appropriately perform driving control corresponding to the predictive degree of traffic congestion.

In the above-mentioned modified example, information of the present positions of other vehicles may be acquired using an in-vehicle communication apparatus, which is capable of communicating with other vehicles, instead of the external surrounding sensor such as the radar apparatus and the imaging apparatus, and the inter-vehicle distances between the electric vehicle 1 and other vehicles may be calculated.

The electric vehicle driving support system 10 according to the embodiment of the present invention may be realized by dedicated hardware. The electric vehicle driving support system 10 may be constructed by a memory and a CPU and the functions thereof may be performed by loading a program (data updating program), which is for realizing the functions of the electric vehicle driving support system 10, into the memory and executing the loaded program.

The program according to the present invention may be recorded on a computer-readable recording medium and the program recorded on the recording medium may be read and executed by a computer system to perform the control. Here, the computer system includes an OS (Operating System) and hardware such as peripherals.

The computer-readable recording medium includes a portable recording medium such as a DVD and a memory card and a storage device such as a hard disk built in the computer system. The computer-readable recording medium also includes a medium dynamically storing a program for a short time like a communication line when the program is transmitted via a network such as the Internet or a communication line such as a telephone line or a device storing a program for a predetermined time like an internal volatile memory of a computer system serving as a server or a client at that time.

The program may serve to realize some of the above-described functions or may serve to realize the above-described functions in combination with programs already recorded on a computer system.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention.

What is claimed is:

1. An electric vehicle comprising: an electric vehicle driving support system comprising at least one processor, the at least one processor programmed to comprise:
   an acquisition unit that acquires predictive information of traffic congestion calculated based on acceleration of the electric vehicle;
   an economical driving mode output unit that outputs a control instruction to prioritize speed maintenance or acceleration of the electric vehicle when the predictive information of traffic congestion acquired by the acquisition unit indicates a non-congestion tendency, and that outputs a control instruction to prioritize deceleration when the predictive information of traffic congestion indicates a congestion tendency, the congestion tendency is a tendency of non-rectify of a traffic flow and represents a high possibility of traffic congestion to occur or a high possibility of previously-occurring traffic congestion, and the non-congestion tendency is a tendency of non-rectify of a traffic flow and represents a low possibility of traffic congestion to occur or a low possibility of previously-occurring traffic congestion;
   a regeneration prioritization mode output unit that outputs a control instruction to prioritize deceleration of the electric vehicle regardless of whether the predictive information of traffic congestion indicates a non-congestion tendency or the predictive information of traffic congestion indicates a congestion tendency; and
   a setting unit that sets which of the economical driving mode output unit and the regeneration prioritization mode output unit to select depending on a selection from a driver.

2. The electric vehicle according to claim 1, the electric vehicle driving support system further comprising:
   a display unit that changes a display mode depending on details of the control instruction output from the economical driving mode output unit.

3. The electric vehicle according to claim 1, wherein the at least one processor is programmed to further comprise:
   a control unit that controls the driving of the electric vehicle depending on details of the control instruction output from the economical driving mode output unit.

4. The electric vehicle according to claim 2, wherein the at least one processor is programmed to further comprise:
    a control unit that controls the driving of the electric vehicle depending on details of the control instruction output from the economical driving mode output unit.

\* \* \* \* \*